US007551851B2

(12) United States Patent
Zirnheld et al.

(10) Patent No.: US 7,551,851 B2
(45) Date of Patent: Jun. 23, 2009

(54) SYSTEM AND METHOD FOR BYPASSING A FAULTY NODE IN AN OPTICAL NETWORK

(75) Inventors: Mark Edward Zirnheld, Virginia Beach, VA (US); Karl Benedict, Virginia Beach, VA (US); Michael Allen Jaskowiak, Virginia Beach, VA (US); Randall Edward Barnes, Norfolk, VA (US); Karol Jan Wojcik, Virginia Beach, VA (US); Mark Ray Boomer, Virginia Beach, VA (US); Michael D. Graves, South Mills, NC (US)

(73) Assignee: Cox Communications, Inc., Atlanta, GA (US)

( * ) Notice: Subject to any disclaimer, the term of this patent is extended or adjusted under 35 U.S.C. 154(b) by 376 days.

(21) Appl. No.: 11/282,490

(22) Filed: Nov. 18, 2005

(65) Prior Publication Data

US 2006/0115268 A1 Jun. 1, 2006

Related U.S. Application Data

(60) Provisional application No. 60/629,886, filed on Nov. 19, 2004.

(51) Int. Cl.
*H04B 10/00* (2006.01)
(52) U.S. Cl. .......................................................... 398/3
(58) Field of Classification Search ................. 398/1–3, 398/5
See application file for complete search history.

(56) References Cited

U.S. PATENT DOCUMENTS 5,271,075 A * 12/1993 Gfeller et al. ................. 385/20
5,442,623 A * 8/1995 Wu ............................. 370/224
5,572,350 A * 11/1996 Spanke ......................... 398/54
5,986,783 A * 11/1999 Sharma et al. ................ 398/59
6,195,186 B1 * 2/2001 Asahi ............................ 398/5
6,640,022 B2 * 10/2003 Yang ........................... 385/16
2002/0114031 A1 * 8/2002 Yamada ...................... 359/119
2002/0159743 A1 * 10/2002 Hwang ....................... 385/134
2004/0227404 A1 * 11/2004 Boros et al. ................... 307/43

OTHER PUBLICATIONS

Harry Dutton, "Understanding Optical Communications", IBM International Technical Support Organization, Sep. 1998.*
Nanchung Lin et al., 'A Reliability Comparison of Single and Double Rings', INFOCOM '90, ningn Annual Joint Conference of the IEEE Computer and Communications Societies, 'The Multiple Facets of Integration' Proceedings, IEEE, Jun. 1990, pp. 504-511, vol. 2.*

* cited by examiner

*Primary Examiner*—Quan-Zhen Wang
(74) *Attorney, Agent, or Firm*—Merchant & Gould

(57) ABSTRACT

A system and methods are provided for communicating optical signals in a multipath optical network, such as ring network architecture. The system and methods provided are operable to bypass a faulty node in the optical network under various conditions. Faulty nodes may be associated with various failures, such as equipment failure, power failure, etc. The system and methods utilize an apparatus for communicating optical signals to adjacent nodes, bypassing the failed node, when a certain amount of power is provided to the node or apparatus. The system and methods utilize an apparatus for communicating optical signals to equipment located at an associated node when an amount of power is not provided to the node or apparatus.

20 Claims, 13 Drawing Sheets

Fig. 5c

| | FIBER W FROM PLANT | LIGHT FROM TX SIDE A SWITCH | FIBER Z FROM PLANT | LIGHT FROM TX SIDE B SWITCH |
|---|---|---|---|---|
| | 1 | 3 | 5 | 7 |
| SIDE A RING IN TX PORT | | 4 | | |
| EQUIPMENT A TX | 2 | | | |
| SIDE B RING IN TX PORT | | | | 8 |
| EQUIPMENT B TX | | | 6 | |
| LOSS | | | | |

Fig. 5d

| | FIBER W | | FIBER Z | |
|---|---|---|---|---|
| | 1 | | 5 | |
| BYPASS MODE SIDE A RING IN TX PORT | | | 9 | |
| BYPASS MODE SIDE B RING IN TX PORT | 10 | | | |
| LOSS | | | | | ered or equal to a threshold voltage, conveying the first optical signal from the first port to a third port of the apparatus and on to equipment of the first node, receiving the first optical signal from the equipment at a fourth port of the apparatus, and conveying the first optical signal from the fourth port to a fifth
SYSTEM AND METHOD FOR BYPASSING A FAULTY NODE IN AN OPTICAL NETWORK

RELATED APPLICATION

Under provisions of 35 U.S.C. §119(e), Applicants claim the benefit of U.S. Provisional Application No. 60/629,886, entitled "Optical Bypass Switch" filed Nov. 19, 2004, which is incorporated herein by reference.

BACKGROUND OF THE INVENTION

Businesses are relying more and more on optical and/or cable optical networks to provide vital information and services to their customers. These optical networks contain various devices for sending and receiving optical between multiple locations. High speed networks, which include Gigabit Ethernet ("GbE") or Asynchronous Transfer Mode ("ATM") networks, typically require a physical layer network. Synchronous Optical Network ("SONET"), a physical layer network, is capable of transporting high speed optical over large distances to one or more destinations. SONET networks are typically deployed on a two-fiber protected ring architecture (see FIG. 1) to provide redundancy in the event of a fault or fiber break.

In a typical ring architecture, a primary ring transmits optical signals in one direction (i.e., clockwise) while a backup ring transmits the optical signals in the reverse direction. Thus, if the primary ring fails, the backup takes over. However, if both rings fail, optical signals will not be received or transmitted from on or more affected nodes. Furthermore, if a node becomes inoperable, optical signals will not be received or transmitted from the affected node. FIG. 1 depicts a situation where power has been lost at node due to a fault or other failure. Thus, node 5 has lost power (indicated by the "X") and is not receiving or transmitting optical signals through fibers A-D, thereby adversely affecting nodes 4 and 6. For example, in 2004, hurricane Isabel caused extensive infrastructure damage, including node service outages due to power loss and damaged equipment. The service outages lasted for several days, tending to adversely affect the business operations which depend on these optical networks. In the aftermath, it is crucial for optical and cable service providers to try to restore lost communications as quickly and as efficiently as possible in order to provide quality services and to maintain customer satisfaction. However, it can be difficult to ascertain the issues and problems associated with affected nodes in the network, which can lead to lengthy and costly interruptions.

It is with respect to these considerations and others that the present invention has been made.

SUMMARY OF THE INVENTION

Embodiments of the present invention provide a system and methods for communicating optical signals in a multipath optical network, such as ring network architecture. In one aspect, a method utilizes an apparatus associated with a first node of an optical network, the method comprising: receiving a first optical signal at a first port of the apparatus; receiving a second optical signal at a second port of the apparatus, and if the apparatus is receiving an amount of voltage greater than or equal to a threshold voltage, conveying the first optical signal from the first port to a third port of the apparatus and on to equipment of the first node, receiving the first optical signal from the equipment at a fourth port of the apparatus, and conveying the first optical signal from the fourth port to a fifth port of the apparatus and on to a second node of the optical network, conveying the second optical signal from the second port to a sixth port of the apparatus and on to the equipment of the first node, receiving the second optical signal from the equipment of the first node at a seventh port of the apparatus, and conveying the second optical signal from the seventh port to an eighth port of the apparatus and on to a third node of the optical network.

According to another aspect, a method is provided for using an apparatus associated with a first node of a ring architecture having a plurality of nodes, the method comprising: receiving a first optical signal from a second node at a first port of the apparatus, receiving a second optical signal from a third node at a second port of the apparatus, and using the apparatus to bypass the first node if the first node is receiving an amount of voltage less than a threshold voltage including: conveying the first optical signal from the first port to a third port of the apparatus and on to the third node of the ring architecture, and conveying the second optical signal from the second port to a fourth port of the apparatus and on to the second node of the ring architecture.

According to yet another aspect, a system is provided which is associated with a first node of an optical network, the system comprising: an optical fiber distribution panel in communication with a plurality of optical signaling rings in the optical network, an optical bypass switch in optical and electrical communication with the optical fiber distribution panel, and an optical switch in optical and electrical communication with the optical fiber distribution panel and the optical bypass switch, the optical bypass switch further comprising: a first port for receiving a first optical signal from the optical fiber distribution panel, a second port for receiving a second optical signal from the optical fiber distribution panel, a third port for receiving the first optical signal from the first port and for conveying the first optical signal to the optical switch if the optical bypass switch is receiving an amount of voltage greater than or equal to a threshold voltage, a fourth port for receiving the first optical signal from the optical switch and for conveying the first optical signal to a second node if the optical bypass switch is receiving an amount of voltage greater than or equal to a threshold voltage, a fifth port for receiving the second optical signal from the second port and for conveying the second optical signal to the optical switch if the optical bypass switch is receiving an amount of voltage greater than or equal to a threshold voltage, and a sixth port for receiving the second optical signal from the optical switch and for conveying the second optical signal to a third node if the optical bypass switch is receiving an amount of voltage greater than or equal to a threshold voltage.

These and various other features as well as advantages, which characterize the present invention, will be apparent from a reading of the following detailed description and a review of the associated drawings.

BRIEF DESCRIPTION OF THE DRAWINGS

FIGS. 5A-5D depict functional block diagrams and charts according to an exemplary optical bypass switch installation procedure.

DETAILED DESCRIPTION OF THE INVENTION

Figure 1:
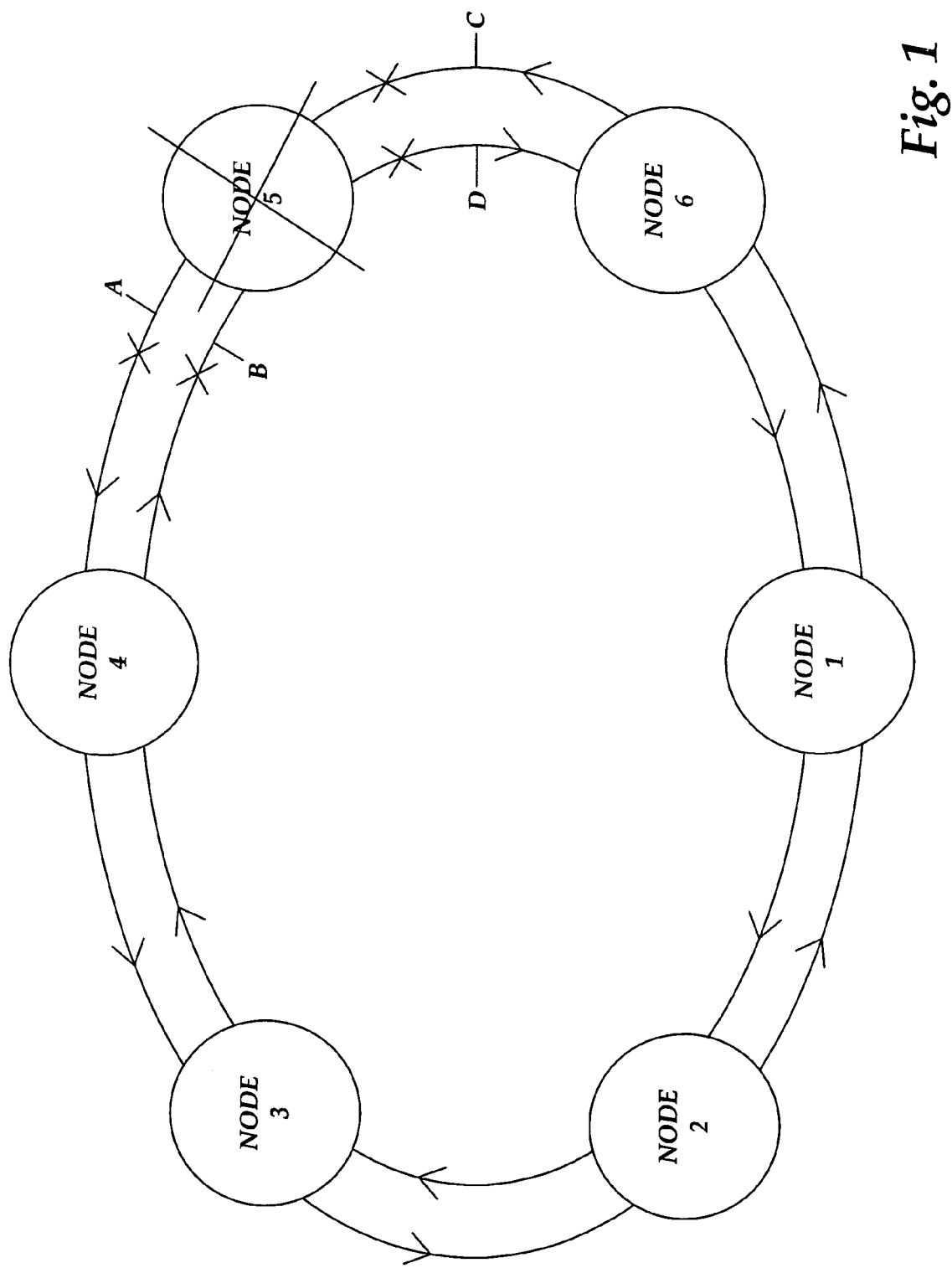
FIG. 1 is a diagram of a ring multipath optical network.

Embodiments of the present invention provide a system and methods for communicating optical signals in a multipath optical network, such as ring network architecture. The system and methods provided are operable to bypass a faulty node in the optical network upon certain conditions. Faulty nodes may be associated with various failures, such as equipment failure, power failure, etc. The system and methods utilize an apparatus for communicating optical signals to adjacent nodes, bypassing the failed node, when a certain amount of power or voltage is not provided to the node or apparatus. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 2:
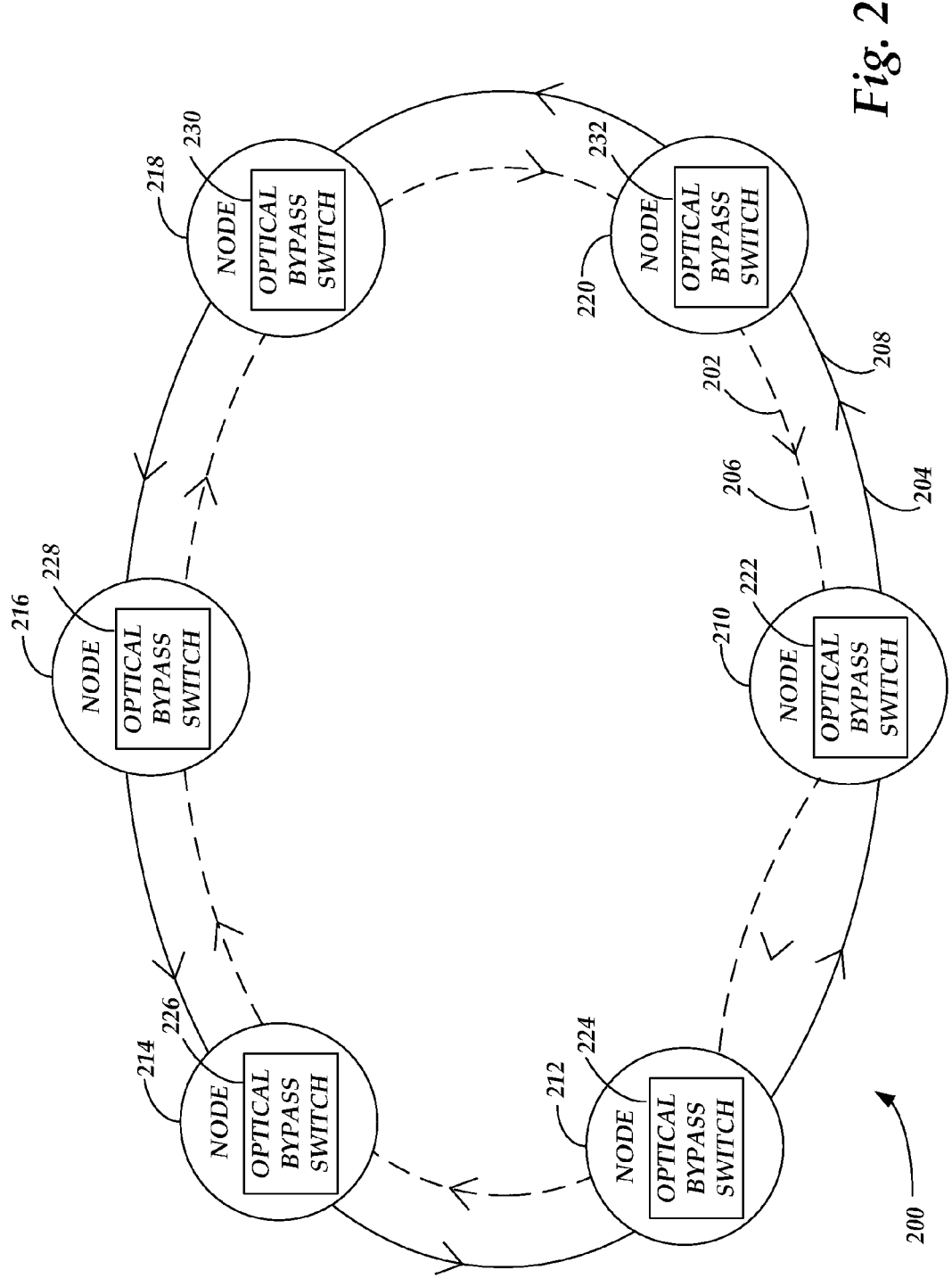
FIG. 2 is a diagram of a ring multipath optical network including a plurality of nodes equipped with optical bypass switches, according to an embodiment of the present invention.

Referring now to FIG. 2, embodiments of the invention can be generally employed in a multipath optical network 200. The multipath optical network 200 includes first and second rings 202 and 204, hereinafter referred to as a ring architecture for communicating an optical signal over a first path 206 (indicated by a dashed ring with arrows pointing in a clockwise direction) and a second path 208 (indicated by a solid ring with arrows pointing in a counter-clockwise direction). It will be appreciated that first and second optical signal paths 206 and 208, and that the signals between nodes within the network 200 can include various data and information.

The multipath optical network 200 includes a plurality of nodes 210-220. Each node 210-220 includes optical transmission and reception equipment for communicating optical signals between nodes 210-220. For this embodiment, each node 210-220 includes an optical bypass switch 222-232. As described further below, each optical bypass switch 222-232 is operable to route optical signals around or bypass an impaired or faulty node. Using an optical bypass switch to bypass an impaired node can substantially preserve the integrity of the optical network 200. As described below, an optical bypass switch can be located at each node 210-220 or select nodes of the multipath optical network 200. Most preferably, an optical bypass switch is located at each upstream node preceding critical entities, such as police departments, hospitals, fire departments, critical network topologies, etc.

In a preferred embodiment, the multipath optical network 200 is physically implemented as a two fiber ring configuration, such as a Universal Path Switched Ring ("UPSR"), and that the nodes 210-220 include fiber-optic transmission systems configured for optical communication in a Synchronous Optical Network ("SONET") environment. For the preferred embodiment, node 210 is a central office (CO) for distributing and receiving optical using the multipath optical network 200. As known to those skilled in the art, SONET is a standard for connecting fiber-optic transmission systems and allows optical signals communicated at different rates to be multiplexed. SONET also enables a control channel to be embedded in an optical flow for communicating various Section Level Control messages related to one or more states of the network.

During normal operation, each node 210-220 in the multipath optical network 200 receives an optical signal from an upstream or downstream node and parses the optical signal for information intended for that node. It will be appreciated that the optical network can include more or less nodes as described herein, and the invention is not intended to be limited to any examples or embodiments described herein. As described above in conjunction with FIG. 1, node 5 is inoperative and thus nodes 4 and 6 are not able to transmit optical signals through node 5. Likewise, nodes 4 and 6 are not able to receive optical signals from node 5.

As described above, an optical bypass switch can be installed at each node 210-220 or select nodes of the multipath optical network 200. In order to simplify the discussion, the foregoing description of an embodiment of the invention will be limited to the utilization of optical bypass switch 230 at node 218. In accordance with aspects of the invention, the optical bypass switch 230 is configured to route optical signals to bypass node 218, if node 218 is inoperable. If node 218 is inoperable, the optical bypass switch 230 is configured to route one or more optical signals around node 218 to nodes 216 and 220, for example. Thus, the optical bypass switch 230, when installed, tends to prevent upstream and downstream service interruptions due to an inoperable node, to thereby maintain the integrity of the ring multipath optical network 200 even though one or more nodes are inoperable.

Figure 3A:
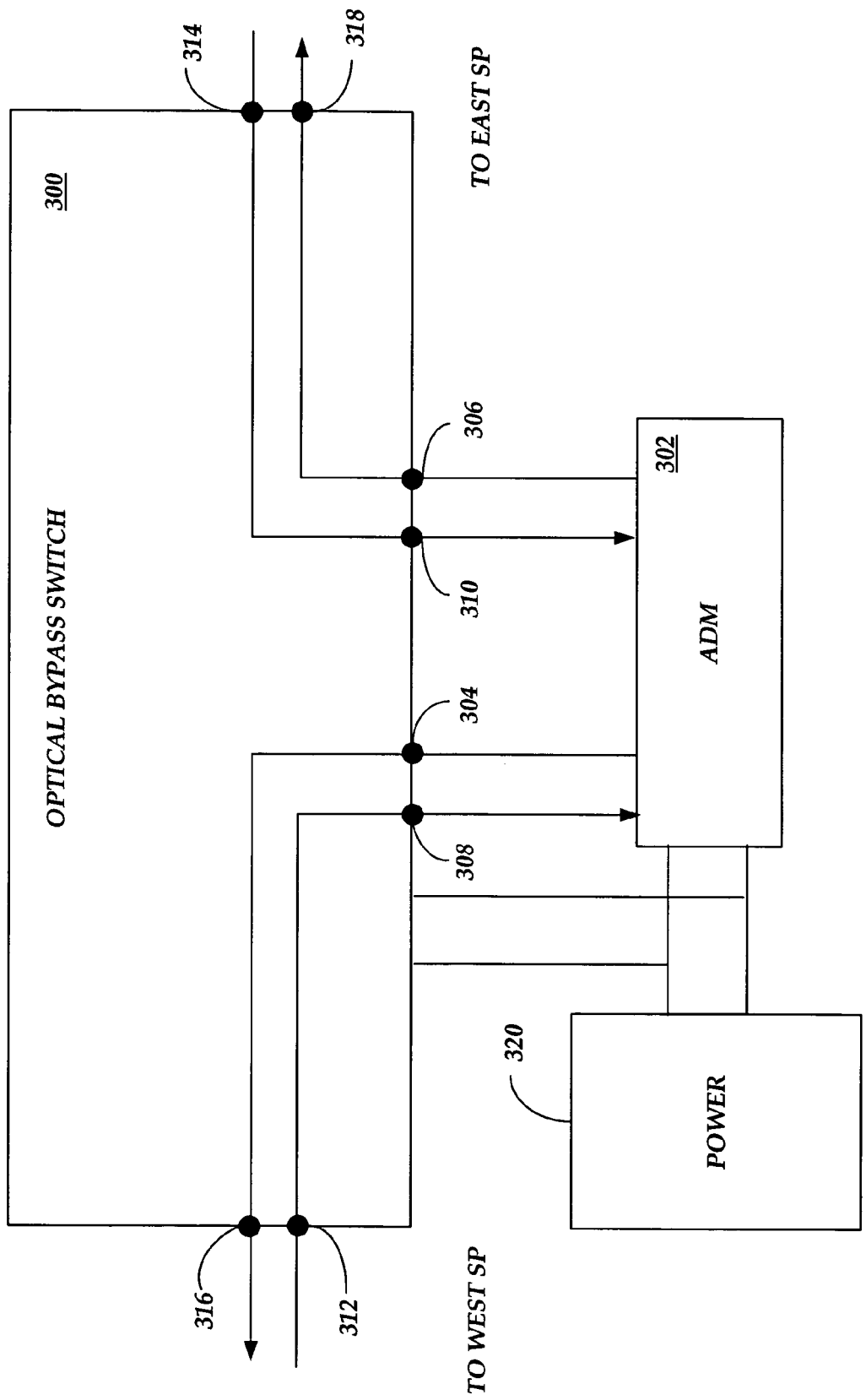
FIGS. 3A-3B are simplified block diagrams of an optical bypass switch installed at a customer location, according to an embodiment of the invention.

FIG. 3A is a simplified block diagram of an optical bypass switch 300 installed at a customer location (a business node upstream of a major hospital, for example), according to an embodiment of the invention. The optical bypass switch 300 is in optical and electrical communication with an add/drop multiplexer (ADM) 302, such as a SONET add/drop multiplexer, via input ports 304 and 306, and output ports 308 and 310. Optical communication as used herein refers to communication of optical over an optical path. The optical bypass switch 300 is also in optical communication with one or more service providers via an east and a west path, via input ports 312 and 314, and output ports 316 and 318. The optical bypass switch 300 and add/drop multiplexer 302 are also in electrical communication with a common fuse panel 320 and other equipment (described below) at the customer location.

Figure 3B:
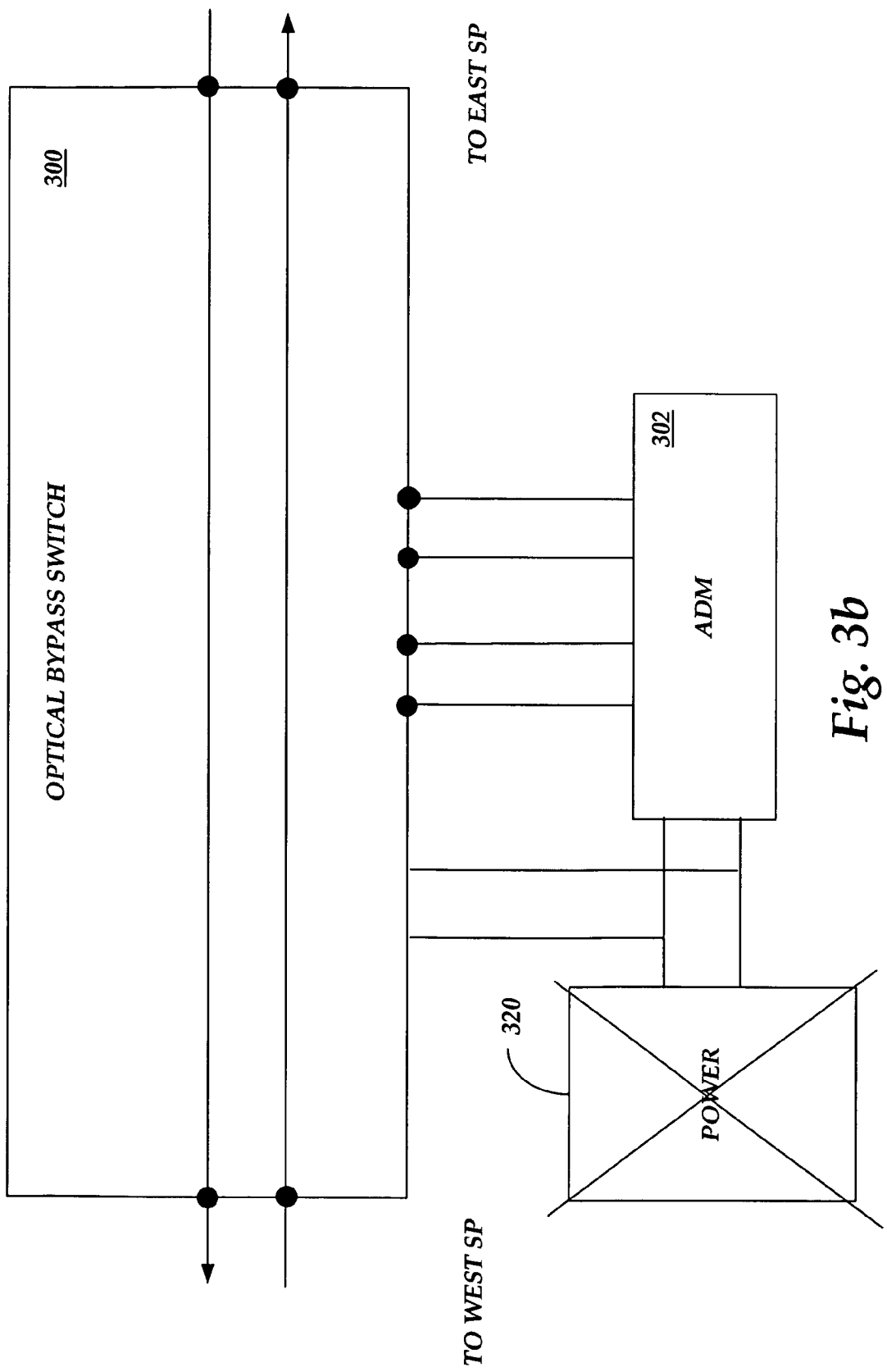

As described below, when an amount of power is supplied to the optical bypass switch 300, the optical bypass switch 300 directs the optical signals to the add/drop multiplexer 302 and other equipment for processing at the customer location, before propagating the optical signals to adjacent nodes. However, as shown in the simplified block diagram of FIG. 3B, the optical signals pass through the optical bypass switch 300 and bypass the add/drop multiplexer 302 and other equipment when an amount of power or voltage falls below a certain threshold or is not being supplied to the optical bypass switch 300.

The optical bypass switch 300 operates to reroute the optical signals and thereby bypass the add/drop multiplexer 302 and other equipment located at the location where the optical bypass switch 300 is installed when an amount of power delivered to the optical bypass switch 300 falls below a threshold. Preferably, the optical bypass switch 300 includes circuitry for sampling the voltage level of the node and is configured to patch out a faulty node from a multipath optical network when an amount of voltage falls below a certain threshold. The optical bypass switch 300 tends to maintain the integrity of the ring architecture (such as a SONET architecture), during power outages at a node, such as a customer location.

Figure 4A:
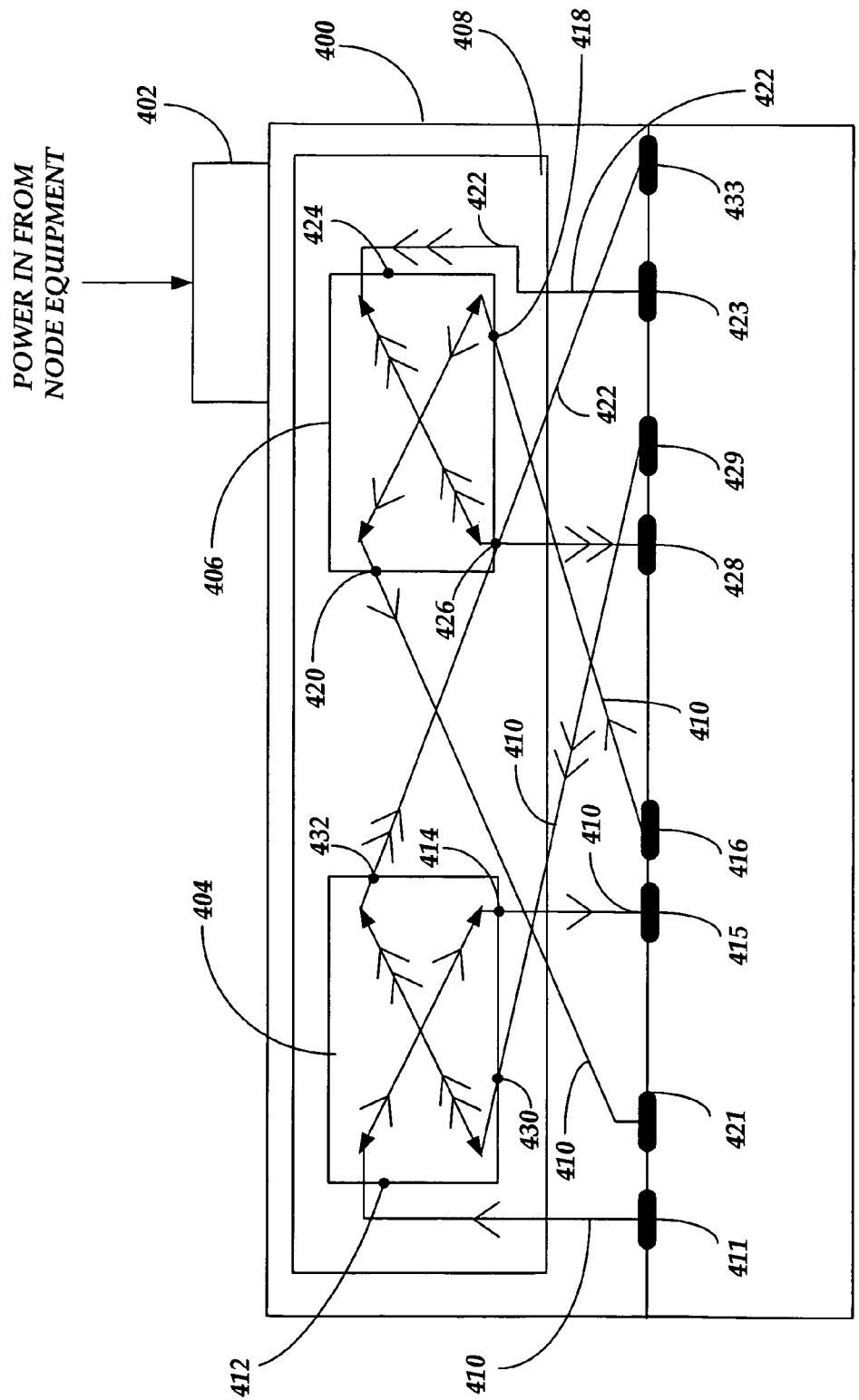
FIGS. 4A-4B depict functional block diagrams of an optical bypass switch, according to an embodiment of the invention.

Referring now to FIG. 4A, a simplified block diagram of an optical bypass switch 400 according to an embodiment of the invention is shown. The optical bypass switch 400 can be installed at a node for patching out or bypassing the respective node when power is interrupted or the node is otherwise faulty, as described above. The optical bypass switch 400 includes a power input 402 for receiving power from an input, typically located at the node. The optical bypass switch 400 preferably includes two 2×2 optical fiber switches 404 and 406, mounted on a printed circuit board 408. The printed circuit board 408 includes circuitry for monitoring input power (a threshold detector for example) to the optical bypass switch 400 and controlling the operation of optical fiber switches 404 and 406 (by way of driving circuits, for example). An exemplary 2×2 optical fiber switch is the "Full 2×2 Optical Fiber Switch," manufactured by OPLINK Communications of San Jose, Calif. Specifications for an exemplary switch are shown in Table 1 below:

The second 2×2 optical fiber switch 406 outputs the optical signal 410 from output 420 to port 421 and on to the West ring towards a second node, completing the cross-state routing of optical signal 410.

Optical signal 422 is received at port 423 from the East ring and input to the second 2×2 optical fiber switch 406 at input 424. Optical signal 422 propagates through the second 2×2 optical fiber switch 406 and exits at output 426 to port 428 and on to the node equipment associated with optical bypass switch 400. Optical signal 422 is then sent to port 429 from the node equipment and on to input 430 of the first 2×2 optical fiber switch 404. The first 2×2 optical fiber switch 404 outputs the optical signal 422 from output 432 to port 433 and on to the East ring toward a third node, completing the cross-state routing of optical signal 422.

Figure 4B:
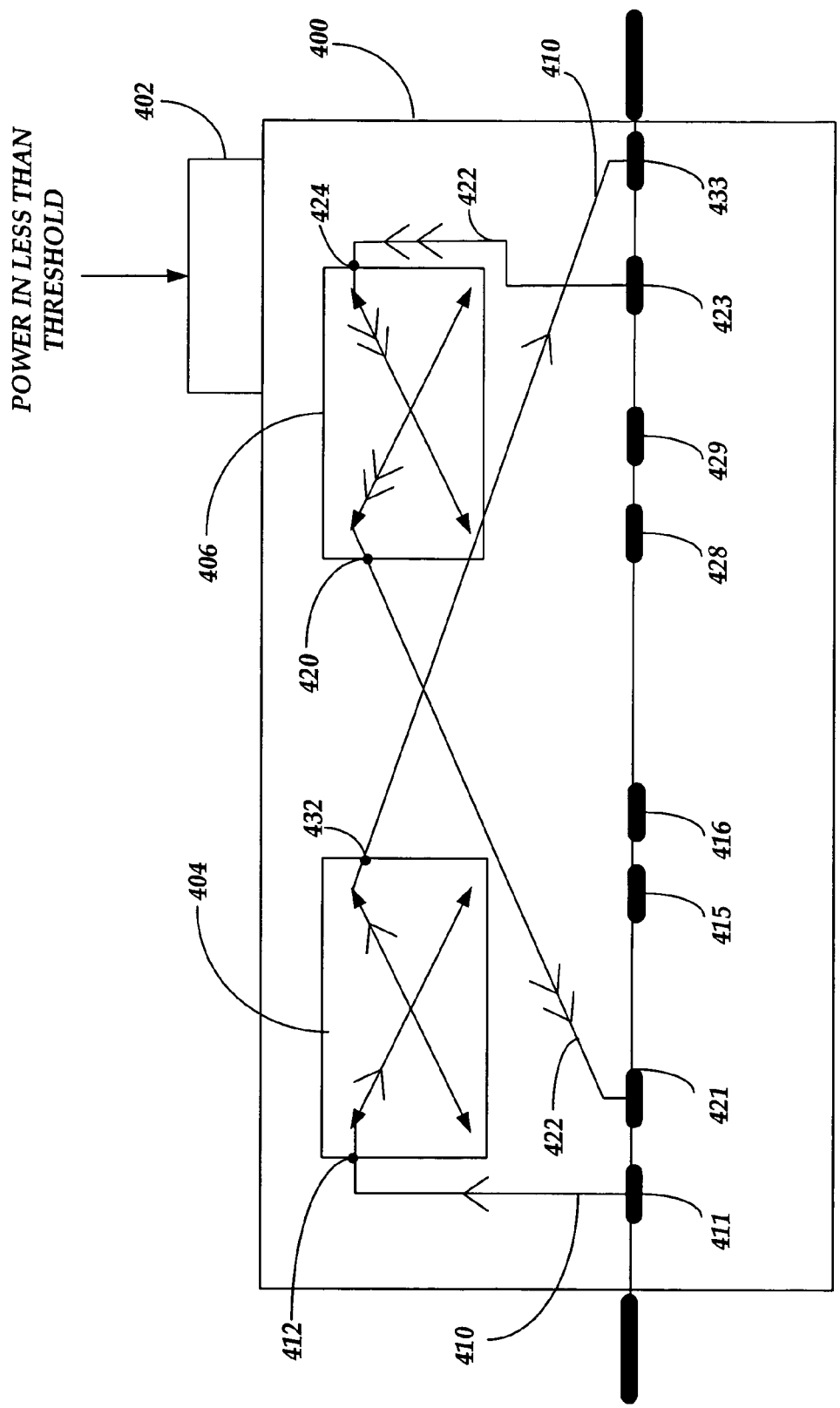

According to this embodiment, once the voltage at the associated node falls below a threshold (such as from a power or equipment failure), the optical bypass switch 400 transitions to "bar-state," as shown in FIG. 4B. Preferably, the optical bypass switch 400 transitions to the bar-state when the input voltage provided to the optical bypass switch 400 drops

TABLE 1

| Item | Parameters | Symbol | Parameter Min | Parameter Typ | Parameter Max | Units | Notes |
|---|---|---|---|---|---|---|---|
| 1. | Wavelength Range | λ | | 1260~1360 | | nm | |
| 2. | Insertion Loss (over all λ, $T_{Op}$, and SOP, include connectors, where) | IL | | | 2.0 | dB | |
| 3. | Temperature Dependent Loss | TDL | | | 0.3 | dB | |
| 4. | Wavelength Dependent Loss (within each window) | WDL | | | 0.3 | dB | |
| 5. | Polarization Dependent Loss | PDL | | | 0.1 | dB | |
| 6. | Crosstalk | | 60 | | | dB | 1 |
| 7. | Repeatability | | | | ±0.02 | dB | |
| 8. | Return Loss    With connector | RL | 50 | | | dB | |
| 9. | Switching Time | | | | 10 | ms | |
| 10. | Switch Type | | | Non-latching | | | |
| 11. | Durability | | $10^7$ | | | cycle | |
| 12. | Operating Power | | | | 500 | mW | |
| 13. | Operating Temperature | $T_{Op}$ | 0 | | 50 | °C. | |
| 14. | Storage Temperature | $T_{Sto}$ | −40 | | 85 | °C. | |
| 15. | Pigtail Type and Length | | | SMF-28, bare fiber, 1.0 ± 0.1 m | | | |
| 16. | Connector Type | | | SC/UPC | | | |

The optical bypass switch 400 shown in FIG. 4A is in a "cross-state" since a certain amount of power is being supplied to the optical bypass switch 400 at the customer location. Preferably, optical bypass switch 400 is electrically coupled to a rectifier unit powering the customer equipment at a site. Since a certain amount of power is being supplied to the optical bypass switch 400, each 2×2 optical fiber switch 404 and 406 operates to direct optical signals coming in from first and second rings to first and second nodes, or customer locations. For this example, assume that the optical bypass switch 400 is implemented at node 216 of FIG. 2.

As shown in FIG. 4A, optical signal 410 is received at port 411 from the West ring and input to the first 2×2 optical fiber switch 404 at input 412. The optical signal 410 propagates through the first 2×2 optical fiber switch 404 and exits at output 414 to port 415 and on to node equipment associated with the optical bypass switch 400. Optical signal 410 is then sent to port 416 from the node equipment and on to input 418 of the second 2×2 optical fiber switch 406. It will be appreciated that node equipment is configured to transmit and receive optical signals and includes other processing features.

to about zero volts (V). As shown in FIG. 4B, optical signal 410 is received at port 411 from the West ring and input to the first 2×2 optical fiber switch 404 at input 412. Since the optical bypass switch 400 has transitioned to the bar-state, the optical signal 410 is output from the first 2×2 optical fiber switch 404 at output 432 to port 433 and on to the East ring, completely bypassing the node equipment, and thereby maintaining the integrity of the ring architecture. port 433 and on to the East ring, completely bypassing the node equipment, and thereby maintaining the integrity of the ring architecture.

Optical signal 422 is received at port 423 from the East ring and input to the second 2×2 optical fiber switch 406 at input 424. Again, since the optical bypass switch 400 has transitioned to the bar-state, the optical signal 422 is output from the second 2×2 optical fiber switch 406 at output 420 to port 421 and on to the West ring, again completely bypassing node equipment, and thereby maintaining the integrity of the ring architecture. It will be appreciated that if either optical signal were to be directed to node equipment, the optical signal would terminate at the equipment since the node equipment is unable to propagate optical signals due to the loss of power or other failure at the node.

Figure 8A:
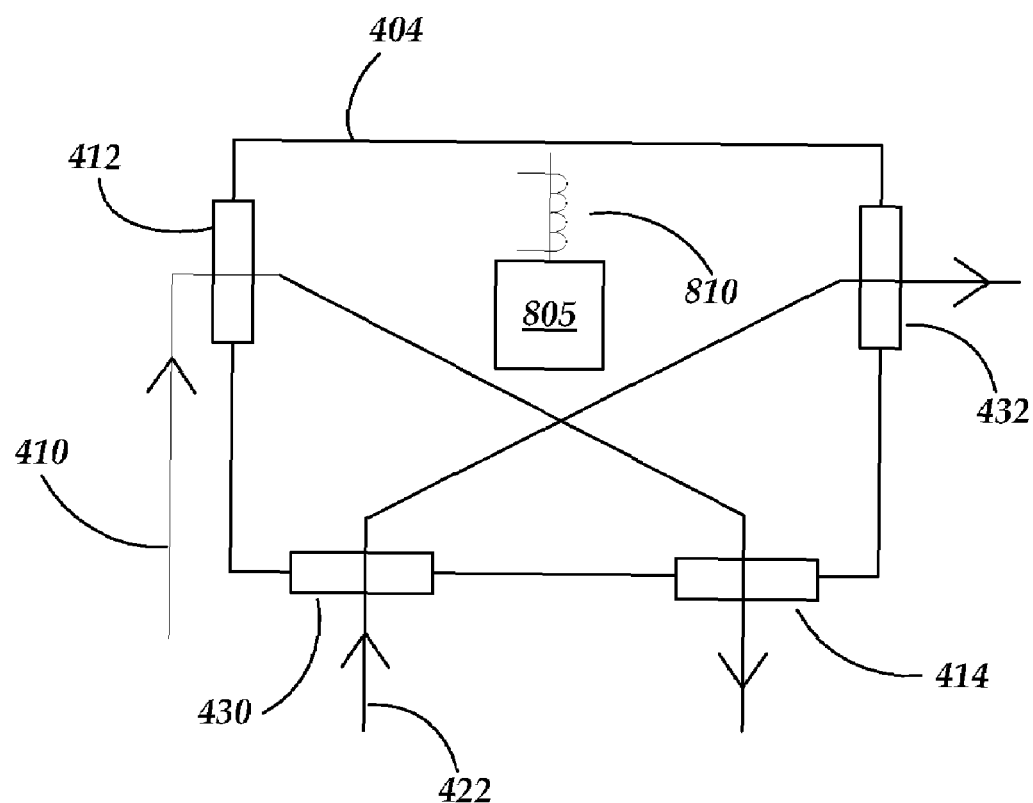
FIGS. 8A-8B depict the operation of a solenoid driven device for redirecting an optical signal.
Figure 8B:
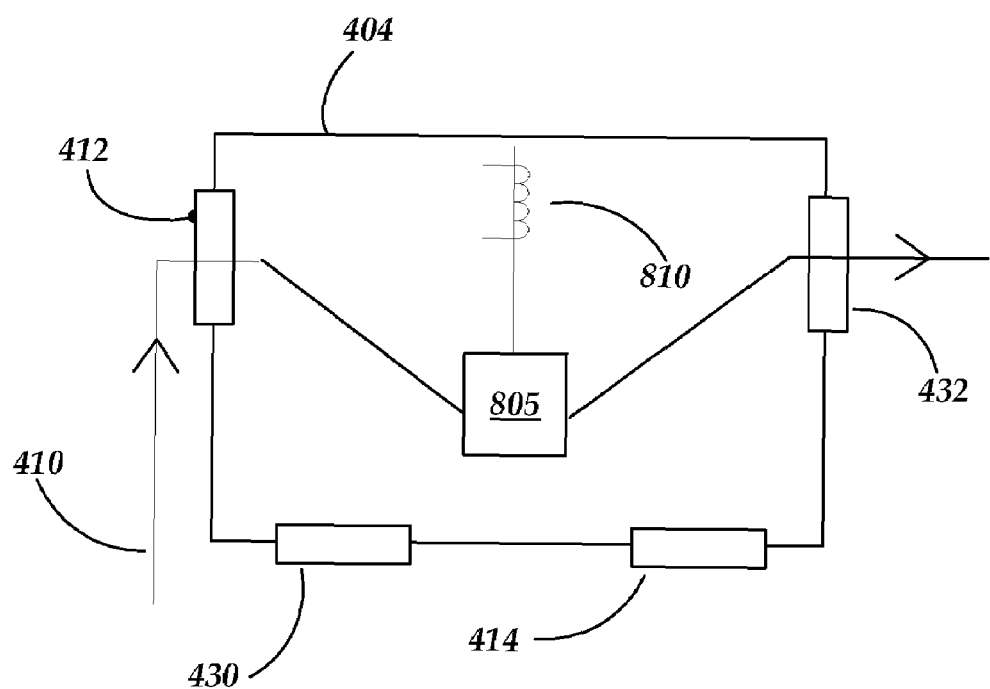

The first and second 2×2 optical fiber switches 404 and 406 each can utilize an internal prism or mirror 810 for redirecting the optical signals when the input power falls below a threshold. For example, a solenoid 805 driven prism 810 can be used to redirect optical signals based on input power to the optical bypass switch. When power falls below a threshold, the solenoid 805 driven prism 810 moves into the optical signal path and redirects the optical signal, as shown in FIGS. 4B and 8B. When a sufficient amount of power is input to the associated node, the solenoid 805 driven prism 810 pulls back into its initial position allowing the optical signal to reach the node equipment, as shown in FIGS. 4A and 8A.

Table 2 below illustrates an exemplary electrical specification for an optical bypass switch. Failure or bar-state mode can be defined as when electrical power input to the exemplary optical bypass switch falls below a threshold. Cross state for the exemplary optical bypass switch can be defined as input voltage being about −56V DC to about −40V DC (with a maximum current of about 100 mA).

TABLE 2

| Pin Number | Name | Input/Output | Function |
| --- | --- | --- | --- |
| 1 | Vcc1 | Input | DC −56 to −40 V (max current 100 mA) |
| 2 | GND | Input | −56 to −40 V return |
| 3 | S1 | Output | S1-S2 close @ SW1 bar state, open |
| 4 | S2 | Output | @ SW1 cross state, S3-S2 close |
| 5 | S3 | Output | @ SW1 cross state, open @ SW1 bar state, |
| 6 | S4 | Output | S4-S5 close @ SW2 bar state, open |
| 7 | S5 | Output | @ SW2 cross state, S6-S5 close |
| 8 | S6 | Output | @ SW2 cross state, open @ SW2 bar state, |
| 9 | — | — | Not Connected |

Figure 5A:
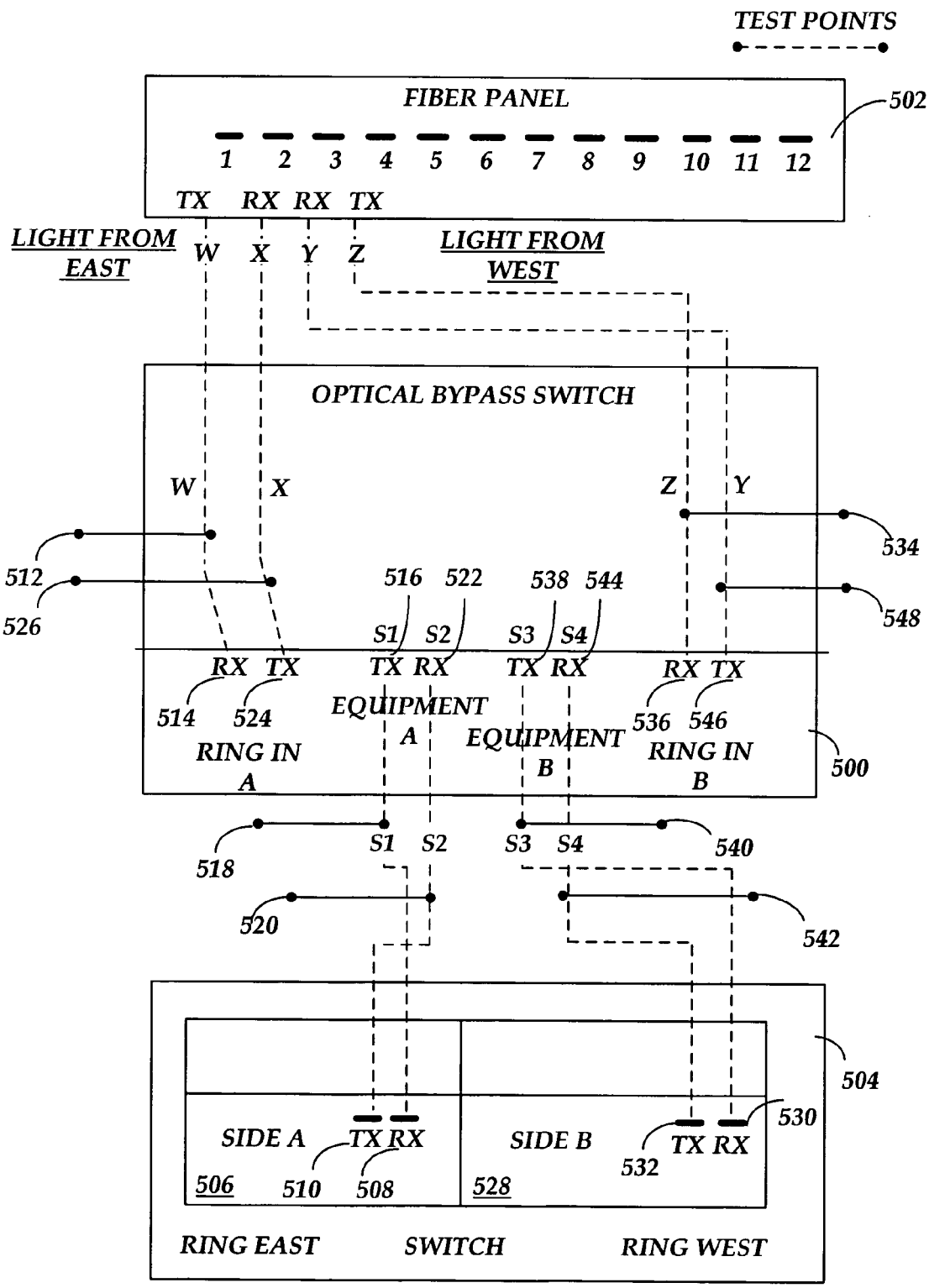
Figure 5B:
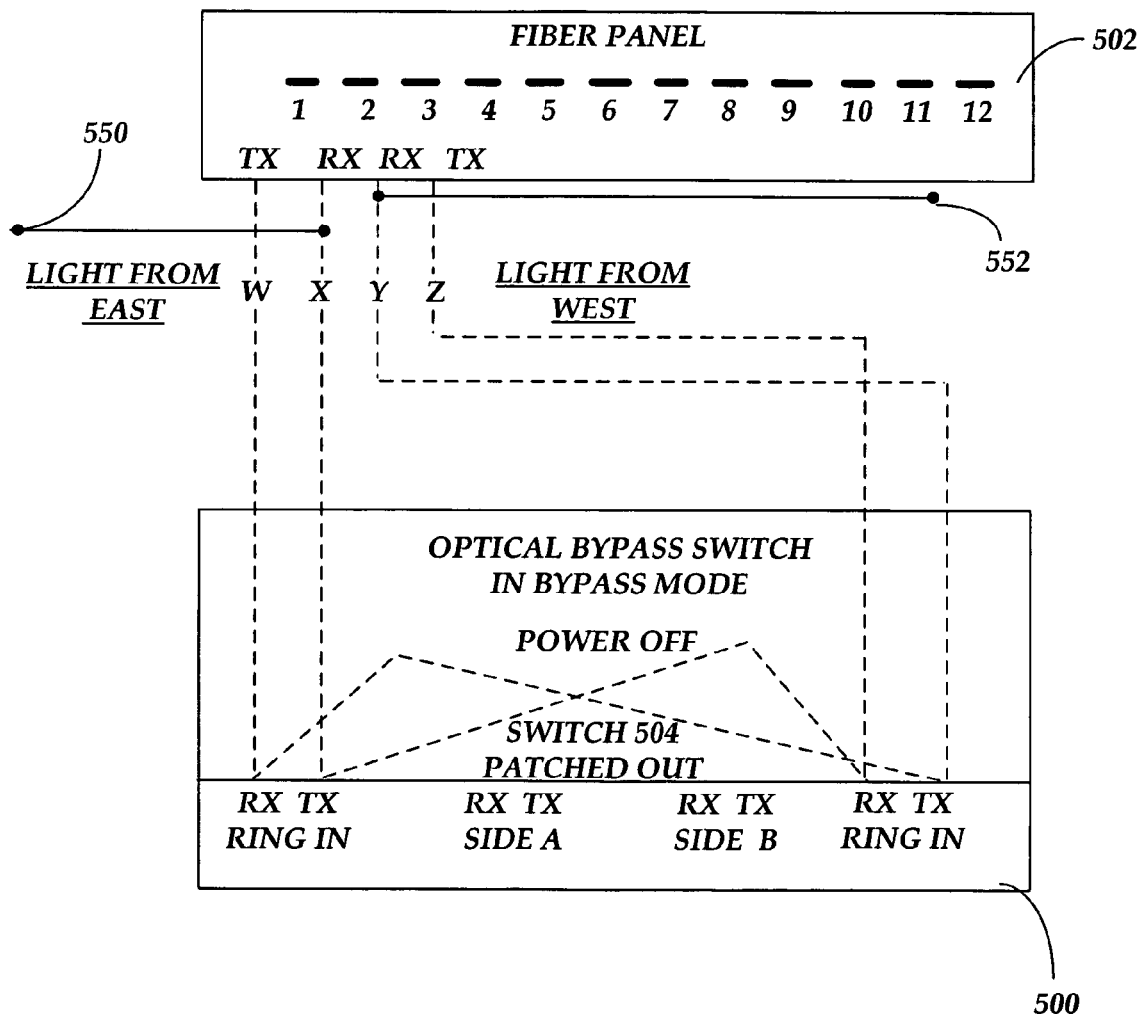

Referring now to FIGS. 5A-5D and FIG. 6, the installation and use of an optical bypass switch 500 at an associated node of a ring optical network according to an embodiment of the invention is described. As shown in FIG. 5A, for this embodiment, the optical bypass switch 500 is installed between an optical fiber distribution panel 502 and a switch 504, such as an asynchronous transfer mode switch (ATM), add/drop multiplexer switch. The optical fiber distribution panel 502 can be standard equipment which receives optical fibers from a central office or other node of the ring optical network.

Figure 6:
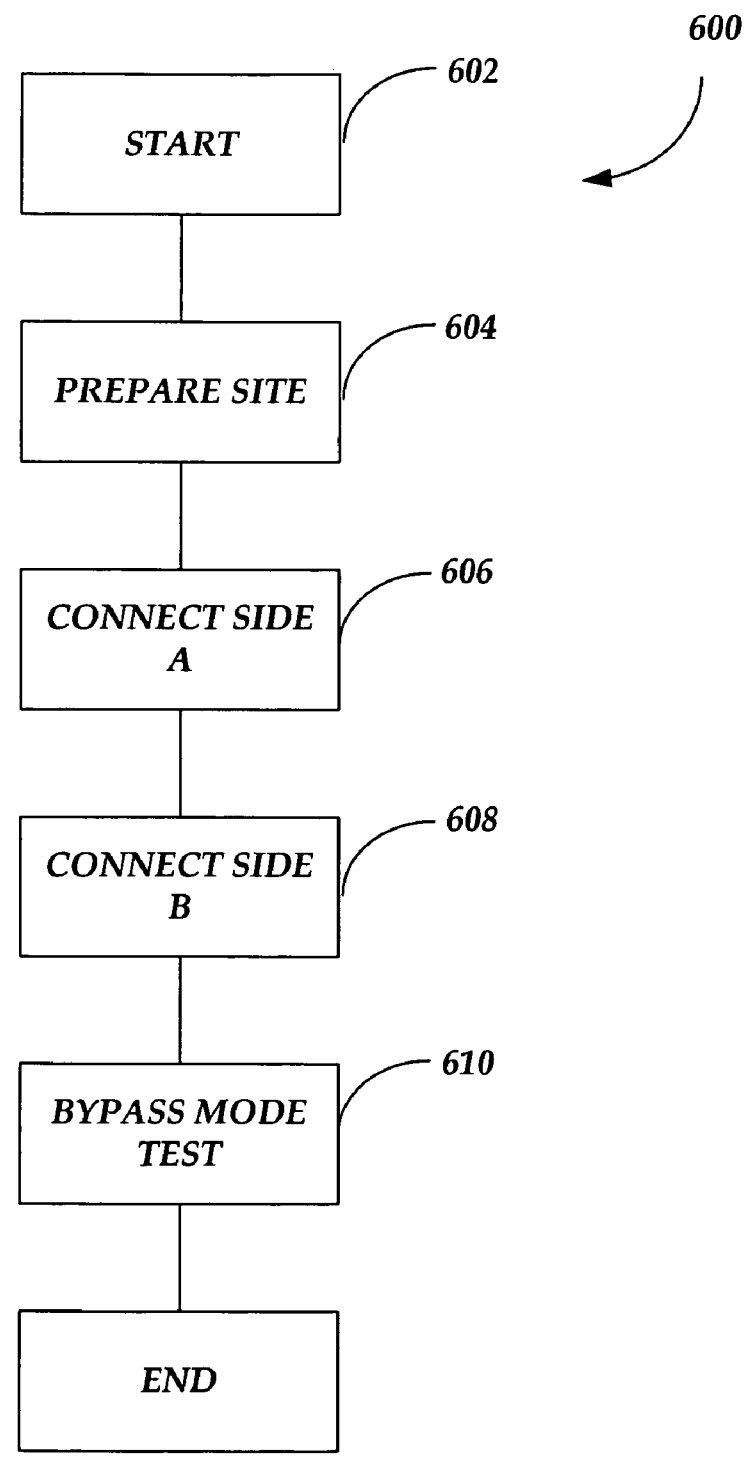
FIG. 6 is a flow diagram illustrating the installation procedure of an optical bypass switch associated with node of an optical network of FIGS. 5A-5D.

The foregoing description describes the procedure for installing the optical bypass switch 500 at a node, such as node 216, of a ring optical network. The flow diagram of FIG. 6 illustrates an installation procedure 600 for installing the optical bypass switch 500. Some tools/parts which a technician can use to install the optical bypass switch 500 might include: single mode fiber jumpers (6 feet in length, for example), wire loom, wire ties, spare optical bypass switch 500, spare 1 ampere fuses, spare fiber jumpers, light meter, fiber cleaner, label maker, laptop, and straight cutters.

The installation procedure 600 begins at 602. At 604, certain preparations can be made at the node before installing the optical bypass switch 500. The installer should ensure that the optical bypass switch 500 is located within a certain distance (5 feet for example) from the fiber panel 502 and the power is connected. The installer should make sure that a fuse is in the power supply and physically trace the fibers to verify where they connect to the switch 504. The installer should then record fiber panel port numbers and corresponding fibers W, X, Y and Z connected to the switch 504, as shown in FIG. 5A. The installer should then label the plant fibers from the fiber panel 502 with labels, ("SFiber #, OBS Side A/B, Ring In TX/RX, ATM/Sonet Ring #", for example), on both the optical bypass switch 500 and fiber panel sides of the fiber.

Next, verify, without disconnecting, that the fibers appear to reach the racked optical bypass switch 500. These fibers will connect the optical bypass switch 500 to the fiber panel 502. Label the (4) fiber jumpers from the optical bypass switch 500 to the switch 504 with labels ("Sfiber #, OBS Side A/B, OBS eq. TX/RX, ASX/Sonet TX/RX", for example). To determine the source and destination of each fiber, the installer can use a diagram such as that depicted in FIG. 5A. The installer can then run jumpers, in wire loom, from the optical bypass switch 500 to the switch 504, without yet coupling the fibers, and also label all 4 fiber jumpers (S1-S4) that run from the optical bypass switch 500 to the switch 504. Next, record light readings and verify ring maps by affected neighboring nodes, and verify timing, signaling neighbors, port status, and traversing circuits on the ring. The installer should re-verify the timing and that the optical bypass switch 500 has power and the "Active" light is green.

At 606, the installation begins with the connecting side A 506 of the switch 504 to the optical bypass switch 500. The installer should verify that light levels are about −18 db to about −11 db before installation and about −20 db to about −11 db after installation. The installer should first disconnect RX fiber 508 (fiber labeled above) and TX fiber 510 (fiber labeled above) from side A 506 of the switch 504. The installer should verify the expected neighboring switch on the ring loses signaling. Next, the installer should clean and take light reading from the side A plant fiber W out of the fiber panel 502 from the neighboring switch on the ring and record light level at test point 512, and connect plant fiber W to the optical bypass switch 500 Side A Ring In RX 514.

The installer should then clean and connect jumper S1 to the optical bypass switch 500 Equipment A TX 516, record the light reading through the optical bypass switch 500 off of S1 at test point 518, and connect jumper S1 to switch side A RX 508. The installer can then clean and connect jumper S2 to switch side A TX 510, record the light reading from the switch 504 at test point 520, and clean and connect jumper S2 to optical bypass switch 500 equipment A RX 522. Next, disconnect plant fiber X from fiber panel 502, and plug into a light meter.

The installer can then clean and connect (the end that was in the switch port) plant fiber X into the optical bypass switch 500 Side A Ring in TX 524, and take and record a light reading from fiber X at test point 526. Next, using known techniques, the loss can be determined in both directions through the optical bypass switch 500 to ensure less than about 2 db loss thru the switch in both directions. The installer should replace the optical bypass switch 500 if loss cannot be corrected by cleaning fibers. Next, clean and connect plant fiber X to the fiber panel 502, which should bring side A into operation. The installer can verify with that signaling is up and matches what was recorded above (also verify that it matches the ring map).

At 608, the installation continues with the connecting side B 528 of the switch 504 to the optical bypass switch 500. The installer should again verify that light levels are about −18 db to −11 db before installation and about −20 db to −11 db after installation. The installer should first disconnect RX fiber 530 (fiber labeled above) and TX fiber 532 (fiber labeled above) from side B 528 of the switch 504. The installer should verify that the expected neighboring switch on the ring loses signaling. Next, the installer should clean and take light reading from the side B plant fiber Z out of the fiber panel 502 from the neighboring switch on the ring and record light level at test point 534, and connect plant fiber Z to the optical bypass switch 500 Side B Ring In RX 536.

The installer should then clean and connect jumper S3 to the optical bypass switch 500 Equipment B TX 538, record the light reading thru the optical bypass switch 500 off of S3 at test point 540, and connect jumper S3 to switch side B RX 530. The installer can then clean and connect jumper S4 to switch side B TX 532, record the light reading from the switch 504 at test point 542, and clean and connect jumper S4 to optical bypass switch 500 equipment B RX 544. Next, disconnect plant fiber Y from fiber panel 502, and plug into the light meter. The installer can then clean and connect (the end that was in the switch port) plant fiber Y into the optical bypass switch 500 Side B Ring in TX 546, and take and record a light reading from fiber Y at test point 548. Next, using known techniques, the loss can be determined in both directions through the optical bypass switch 500 to ensure less than about 2 db loss thru the switch in both directions. Again, the installer should replace the optical bypass switch 500 if loss cannot be corrected by cleaning fibers. Next, clean and connect plant fiber Y to the fiber panel 502, which should bring side B into operation. The installer can verify with that signaling is up and matches what was recorded above (also verify that it matches the ring map).

Next, the installer can perform a bypass mode test at 610. The installer can verify there is "dial tone" on a site phone if there is a T1 on the node equipment. Next, the installer can remove the fuse from the optical bypass switch 500 power supply and the green LED power indicator should go out. Once power is removed from the optical bypass switch 500, verify that neighboring switches now see each other, and signaling is up. With the power off, disconnect plant fiber X from the fiber panel 502 and plug into the light meter, record the light reading at test point 550 of FIG. 5B, and then reconnect to the fiber panel 502. Then disconnect plant fiber Y from the fiber panel 502, plug it into the light meter, record the light reading at test point 552, and reconnect to the fiber panel 502. Again, determine the loss through the optical bypass switch 500. The installer can replace the fuse for the optical bypass switch 500, verify that the node cuts back into the ring, and compare the calculated loss on both tables 3 and 4 (FIGS. 5C-5D) to ensure they agree. Then, the installer can verify timing, signaling neighbors, port status and traversing circuits on the ring.

Figures 7A, 7B, 7C:
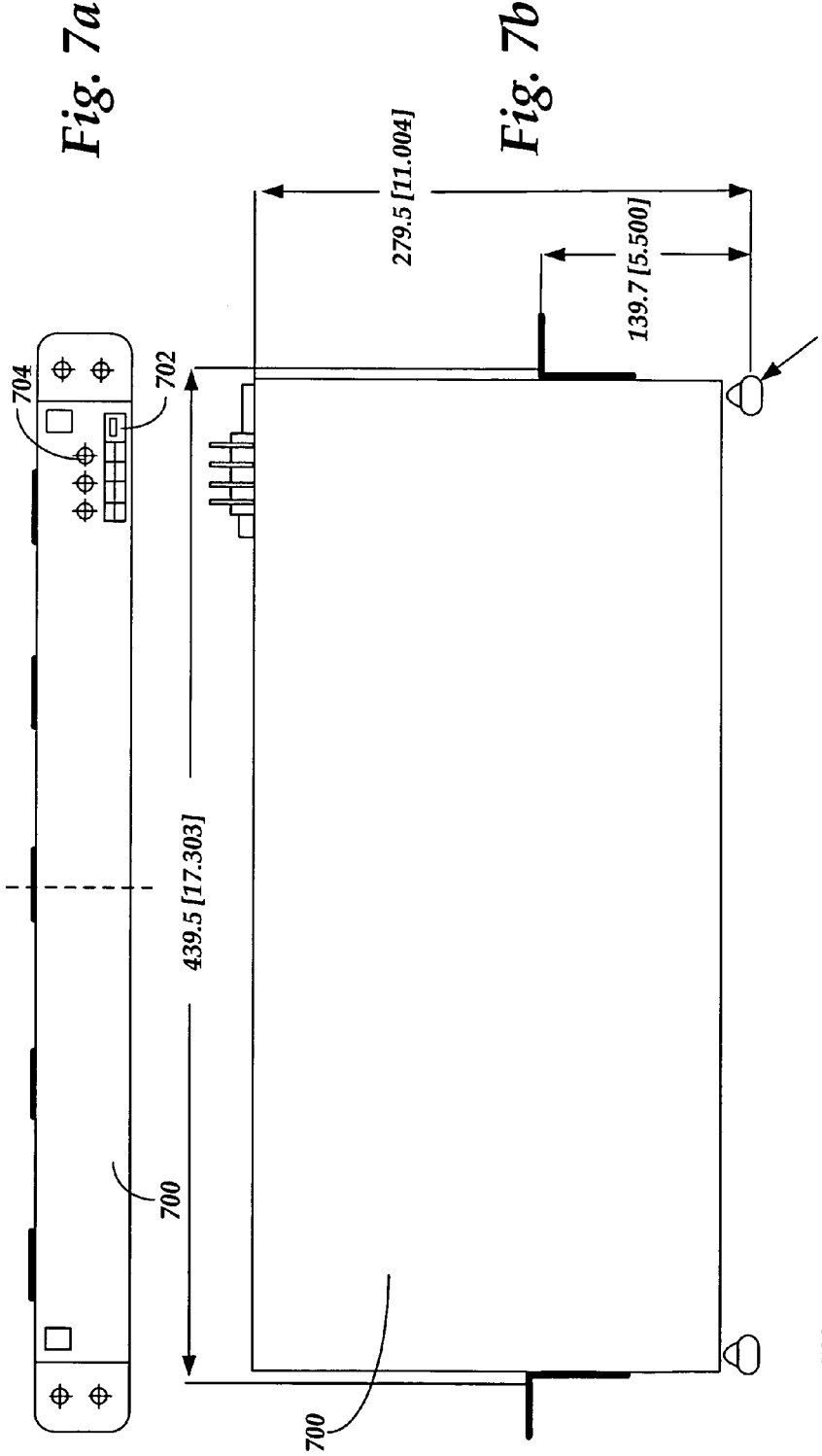
FIGS. 7A-7C depict an exemplary optical bypass switch for use in an optical network.

FIGS. 7A-7C depict an exemplary optical bypass switch 700. FIG. 7A is a rear view of the optical bypass switch 700 including optical fiber connection ports 702 and power input 704. FIG. 7B is a plan view of the optical bypass switch 700, and FIG. 7C is a front view of the optical bypass switch 700, showing the LED indicator 706.

It will be appreciated that the various components discussed above can include components conforming to the Gigabit Ethernet specification and compatible with a SONET network environment. As known by those skilled in the art, the Gigabit Ethernet specification supports optical communication for applications requiring high optical transfer rates, such as Video-On-Demand ("VoD") and Subscription Video-On-Demand ("SVoD"). The architecture can include Gigabit Ethernet components capable of communicating 10 Gigabit optical signals in an optical network.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for using an apparatus associated with at least one node of an optical network, the method comprising:
    receiving a first optical signal at a first port of the apparatus;
    receiving a second optical signal at a second port of the apparatus;
    if the apparatus is receiving an amount of voltage greater than or equal to a threshold voltage, then:
        conveying the first optical signal from the first port to a third port of the apparatus and on to equipment of a first node,
        receiving the first optical signal from the equipment at a fourth port of the apparatus,
        conveying the first optical signal from the fourth port to a fifth port of the apparatus and on to a second node of the optical network,
        conveying the second optical signal from the second port to a sixth port of the apparatus and on to the equipment of the first node,
        receiving the second optical signal from the equipment of the first node at a seventh port of the apparatus, and
        conveying the second optical signal from the seventh port to an eighth port of the apparatus and on to a third node of the optical network; and
    if the apparatus is receiving an amount of voltage less than the threshold voltage, then bypassing the first node using a solenoid driven device comprising one of a prism and a mirror within the apparatus to redirect the first optical signal and the second optical signal, wherein using the solenoid driven device within the apparatus to redirect the first optical signal and the second optical signal comprises:
        moving the solenoid driven device into one of a first optical signal path and a second optical signal path when the apparatus is receiving the amount of voltage less than the threshold voltage, and
        moving the solenoid driven device back into an initial position when the apparatus is receiving the amount of voltage greater than or equal to the threshold voltage.

2. The method of claim 1, further comprising conveying the first optical signal from the first port to the eighth port and on to the third node of the optical network if the apparatus is receiving the amount of voltage less than the threshold voltage.

3. The method of claim 1, further comprising conveying the second optical signal from the second port to the fifth port and on to the second node of the optical network if the apparatus is receiving the amount of voltage less than the threshold voltage.

4. The method of claim 1, further comprising coupling the apparatus to an optical fiber distribution panel and a switch at the first node.

5. The method of claim 4, further comprising using the apparatus to direct the first optical signal and the second optical signal to the switch at the first node.

6. The method of claim 1, further comprising installing the apparatus at the first node of a ring architecture.

7. The method of claim 6, further comprising installing the apparatus at the first node which precedes a critical node of the ring architecture.

8. The method of claim 1, wherein the solenoid driven device comprises an internal prism.

9. The method of claim 1, wherein the solenoid driven device comprises a mirror.

10. A method for using an apparatus associated with at least one node of a ring architecture having a plurality of nodes, the method comprising:
receiving a first optical signal from a second node at a first port of the apparatus,
receiving a second optical signal from a third node at a second port of the apparatus; and
bypassing a first node using a solenoid driven device comprising one of a prism and a mirror within the apparatus if the first node is receiving an amount of voltage less than a threshold voltage, wherein bypassing the first node using a solenoid driven device within the apparatus if the first node is receiving the amount of voltage less than the threshold voltage comprises:
moving the solenoid driven device into one of a first optical signal path and a second optical signal path when the first node is receiving the amount of voltage less than the threshold voltage,
conveying the first optical signal from the first port to a third port of the apparatus and on to the third node of the ring architecture,
conveying the second optical signal from the second port to a fourth port of the apparatus and on to the second node of the ring architecture, and
moving the solenoid driven device back into an initial position when the first node is receiving an amount of voltage greater than or equal to the threshold voltage.

11. The method of claim 10, further comprising conveying the first optical signal from the first port to equipment located at the first node and subsequently to the second node if the first node is receiving the amount of voltage greater than or equal to the threshold voltage.

12. The method of claim 11, further comprising conveying the first optical signal from the first port to a first 2×2 optical switch prior to conveying the first optical signal to the equipment and then to a second 2×2 optical switch before conveying the first optical signal to the second node.

13. The method of claim 10, further comprising conveying the second optical signal from the second port to equipment located at the first node and subsequently to the third node if the apparatus is receiving the amount of voltage greater than or equal to the threshold voltage.

14. The method of claim 13, further comprising conveying the second optical signal from the first port to a first 2×2 optical switch prior to conveying the second optical signal to the equipment and then to a second 2×2 optical switch before conveying the second optical signal to the third node.

15. The method of claim 10, further comprising coupling the apparatus to an optical fiber distribution panel and an optical multiplexer at the first node.

16. An optical system implementing the method of claim 10.

17. A system associated with at least one node of an optical network, the system comprising:
an optical fiber distribution panel in communication with a plurality of optical signaling rings in the optical network;
an optical bypass switch in optical and electrical communication with the optical fiber distribution panel; and
an optical switch in optical and electrical communication with the optical fiber distribution panel and the optical bypass switch,
the optical bypass switch further comprising:
a power input for receiving an amount of power associated with a first node,
a first port for receiving a first optical signal from the optical fiber distribution panel,
a second port for receiving a second optical signal from the optical fiber distribution panel,
a third port for receiving the first optical signal from the first port and for conveying the first optical signal to the optical switch if a voltage received at the optical bypass switch is greater than or equal to a threshold voltage,
a fourth port for receiving the first optical signal from the optical switch and for conveying the first optical signal to a second node if the voltage received at the optical bypass switch is greater than or equal to the threshold voltage,
a fifth port for receiving the second optical signal from the second port and for conveying the second optical signal to the optical switch if the voltage received at the optical bypass switch is greater than or equal to the threshold voltage,
a sixth port for receiving the second optical signal from the optical switch and for conveying the second optical signal to a third node if the voltage received at the optical bypass switch is greater than or equal to the threshold voltage, and
a solenoid driven device comprising one of a prism and a mirror within the optical bypass switch configured to cause the first optical signal and the second optical signal to bypass the first node if the voltage received at the optical bypass switch is less than the threshold voltage, wherein the solenoid driven device is operative to:
move into one of a first optical signal path and a second optical signal path when the voltage received at the optical bypass switch is less than the threshold voltage, and
move back into an initial position when the voltage received at the optical bypass switch is greater than or equal to the threshold voltage.

18. The system of claim 17, wherein the first port of the optical bypass switch conveys the first optical signal to the fourth port of the optical bypass switch, bypassing the optical switch if the amount of power received is less than the threshold voltage.

19. The system of claim 17, wherein the second port of the optical bypass switch conveys the second optical signal to the sixth port of the optical bypass switch, bypassing the optical switch if the amount of power received is less than the threshold voltage.

20. The system of claim 17 configured to be implemented in a ring synchronous optical network ("SONET").

* * * * *